(12) United States Patent
Lindacher et al.

(10) Patent No.: US 7,192,138 B2
(45) Date of Patent: Mar. 20, 2007

(54) OPHTHALMIC LENS WITH OPTIMAL POWER PROFILE

(75) Inventors: Joseph Michael Lindacher, Lawrenceville, GA (US); Courtney Flem Morgan, Alpharetta, GA (US); Rafael Victor Andino, Lawrenceville, GA (US)

(73) Assignee: Novartis AG, Basel (CH)

( * ) Notice: Subject to any disclaimer, the term of this patent is extended or adjusted under 35 U.S.C. 154(b) by 32 days.

(21) Appl. No.: 11/443,769

(22) Filed: May 31, 2006

(65) Prior Publication Data

US 2006/0215109 A1    Sep. 28, 2006

Related U.S. Application Data

(63) Continuation of application No. 10/920,963, filed on Aug. 18, 2004, now abandoned.

(60) Provisional application No. 60/496,456, filed on Aug. 20, 2003.

(51) Int. Cl.
    *G02C 7/06*    (2006.01)
(52) U.S. Cl. .................. 351/168; 351/164; 351/169
(58) Field of Classification Search ................ 351/168
    See application file for complete search history.

(56) References Cited

U.S. PATENT DOCUMENTS

| | | | |
|---|---|---|---|
| 4,861,152 A | 8/1989 | Vinzia et al. ................ 351/161 |
| 5,452,031 A | 9/1995 | Ducharme .................. 351/177 |
| 5,570,143 A | 10/1996 | Newman .................... 351/176 |
| 5,790,231 A | 8/1998 | Mercier ...................... 351/161 |
| 5,807,381 A | 9/1998 | Lieberman ...................... 606/5 |
| 5,861,114 A | 1/1999 | Roffmann et al. ........... 264/2.5 |
| 5,880,809 A | 3/1999 | Lieberman et al. ......... 351/160 |
| 5,953,098 A | 9/1999 | Lieberman et al. ......... 351/160 |
| 5,971,542 A | 10/1999 | Volker et al. ............... 351/161 |
| 6,145,987 A | 11/2000 | Baude et al. ............... 351/169 |
| 6,145,988 A | 11/2000 | Manfredini ................. 351/177 |
| 6,149,609 A | 11/2000 | Lieberman et al. ......... 600/587 |
| 6,176,579 B1 | 1/2001 | Mandell ..................... 351/161 |

(Continued)

FOREIGN PATENT DOCUMENTS

EP    0 742 466 A2    11/1996

(Continued)

OTHER PUBLICATIONS

International Search Report PCT/EP2004/009322 Mailed Jan. 12, 2005.

*Primary Examiner*—Jordan Schwartz
*Assistant Examiner*—Jessica Stultz
(74) *Attorney, Agent, or Firm*—Jian Zhou (57) ABSTRACT

An ophthalmic lens includes an optical zone having a center and a spaced-apart periphery. The optical zone has a first corrective power range in a first region and a second corrective power range in an annular region surrounding the first optical zone. The second corrective power is corrective of spherical aberration of an eye. The optical zone has a power profile that gradually changes from the first corrective power to the second corrective power. A central progressive zone that provides intermediate vision correction may be applied to a central region of the lens. The progressive zone has a diameter that is less than or equal to the diameter of an aperture of a pupil when subjected to bright light.

16 Claims, 4 Drawing Sheets

U.S. PATENT DOCUMENTS

| | | | |
|---|---|---|---|
| 6,206,520 B1 | 3/2001 | Jubin et al. | 351/160 |
| 6,241,355 B1 | 6/2001 | Barsky | 351/177 |
| 6,340,229 B1 | 1/2002 | Lieberman et al. | 351/160 |
| 6,364,482 B1 | 4/2002 | Roffman et al. | 351/160 |
| 6,390,624 B1 | 5/2002 | Hough | 351/177 |
| 6,457,826 B1 | 10/2002 | Lett | 351/161 |
| 6,491,392 B2 | 12/2002 | Roffman et al. | 351/160 |
| 6,554,427 B1 | 4/2003 | Davis et al. | 351/177 |
| 6,595,640 B1 | 7/2003 | Jubin | 351/177 |
| 6,726,323 B2 | 4/2004 | Miyamura et al. | 351/160.4 |
| 6,808,266 B2 * | 10/2004 | Youssefi | 351/246 |
| 6,843,563 B2 | 1/2005 | Richardson | 351/160 |
| 6,883,915 B2 | 4/2005 | Ye et al. | 351/160 |
| 7,004,585 B2 | 2/2006 | Lindacher | 351/161 |
| 7,036,931 B2 | 5/2006 | Lindacher et al. | 351/161 |
| 7,040,757 B2 | 5/2006 | Hall et al. | 351/160 |
| 2002/0044255 A1 | 4/2002 | Ye | 351/168 |
| 2002/0183772 A1 | 12/2002 | Lieberman et al. | 606/166 |
| 2003/0055412 A1 | 3/2003 | Lieberman et al. | 606/5 |
| 2003/0103187 A1 | 6/2003 | Miyamura et al. | 351/161 |
| 2003/0160941 A1 | 8/2003 | Ye et al. | 351/161 |
| 2004/0017542 A1 | 1/2004 | Lindacher et al. | 351/160 |
| 2004/0021824 A1 | 2/2004 | Ye et al. | 351/161 |
| 2004/0021825 A1 | 2/2004 | Richardson | 351/168 |
| 2004/0046287 A1 | 3/2004 | Andino et al. | 264/401 |
| 2004/0075807 A1 | 4/2004 | Ho et al. | 351/160 |
| 2004/0156013 A1 | 8/2004 | Lindacher et al. | 351/160 |
| 2004/0207807 A1 | 10/2004 | Lindacher | 351/160 |
| 2004/0233382 A1 | 11/2004 | Lindacher et al. | 351/160 |
| 2004/0246440 A1 | 12/2004 | Andino et al. | 351/177 |
| 2005/0099597 A1 * | 5/2005 | Sandstedt et al. | 351/168 |

FOREIGN PATENT DOCUMENTS

| | | |
|---|---|---|
| EP | 0 742 466 A3 | 11/1998 |
| EP | 0 742 466 B1 | 7/2003 |

\* cited by examiner

PRIOR ART

OPHTHALMIC LENS WITH OPTIMAL POWER PROFILE

This application is a continuation of U.S. patent application Ser. No. 10/920,963, filed Aug. 18, 2004 now abandoned, which claims the benefits under 35 USC § 119(e) of U.S. provisional application No. 60/496,456, filed Aug. 20, 2003, incorporated by reference in its entirety. This application incorporates by reference co-pending U.S. patent application Ser. No. 10/616,378, entitled "Method for Manufacturing a Contact Lens", filed on Jul. 9, 2003, commonly assigned to the assignee of the present application, the disclosure of which is incorporated herein in its entirety.

The present invention relates to ophthalmic lenses and, more specifically to an ophthalmic lens having an optimal power profile for vision.

BACKGROUND OF THE INVENTION

Contact lenses are ophthalmic lenses worn on the anterior cornea that are widely used for correcting many different types of vision deficiencies. These include defects such as near-sightedness (myopia) and far-sightedness (hypermetropia), astigmatism, and defects in near range vision usually associated with aging (presbyopia). A typical single vision contact lens has a real or virtual focus, which is the point at which parallel rays of light focus when the lens is placed perpendicular to the parallel rays, and an optical axis, which is an imaginary line drawn from the focus to the center of the optical zone of the lens. A posterior surface of the contact lens fits against the cornea and an opposite anterior surface has an optical zone that refracts light to correct vision. In the case of a typical spherical lens, the optical zone has a single radius of curvature, whereas the distance from any point on the optical zone to a point on the optical axis referred to as the center of curvature.

The optical zone is typically at the central section of the contact lens that corrects the refractive error of the wearer.

Figure 1A:
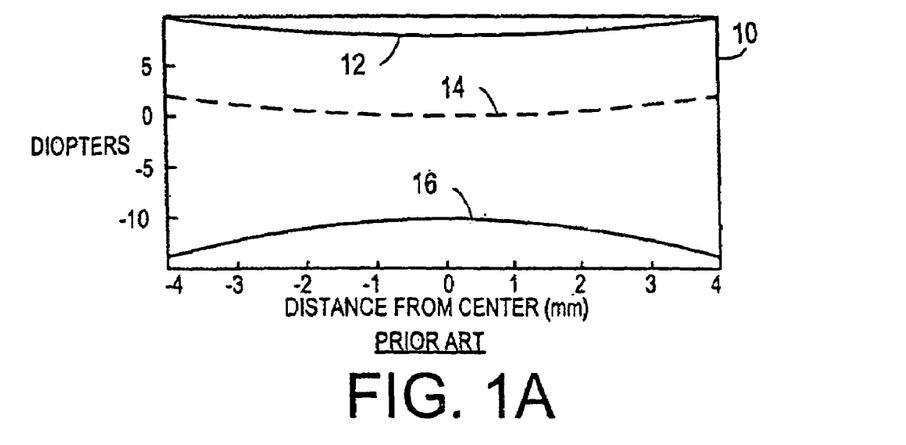
FIG. 1A is a power profile diagram showing prior art spherical aberration curves for three types of lenses as a function of distance from the line of sight.

A typical human eye, as a result of the optical characteristics of the cornea and crystal lens, inherently exhibits an increasing amount of spherical aberration as the diameter of the pupil expands. Typically, the spherical aberration, of an adult, is about one diopter for a 6 mm diameter pupil, while the spherical aberration is slightly less than two diopters for an 8 mm pupil, regardless of the eye's sphero-cylindrical manifest refraction. Spherical aberration typically results in degraded night vision—when the pupils are dilated. FIG. 1A is a diagram 10 showing the power of lenses designed with spherical or toric surfaces for +6 diopters 12, 0 diopters 14 and −10 diopters 16. The variation in power across the optical zone, or pupil, is the spherical aberration of the lens. The dashed line 14 depicts the nominal amount of spherical aberration of the eye for an individual with a plano refraction.

Individuals including computer users or individuals at the onset of presbyopia require an intermediate corrective power for viewing objects, such as computer screens, at a range of about two to three feet. Generally, light from a computer monitor causes the diameter of the pupil to contract (myosis). While there exist contact lenses that provide intermediate correction, having to change back and forth between normal lenses and intermediate lenses is awkward for the user. Intermediate mono-vision is not well tolerated by most individuals.

Therefore, there is a need for a contact lens that corrects the spherical aberration of the eye.

There is also a need for a contact lens that provides intermediate correction under certain circumstances, but that also provides distance vision correction that is not compromise.

SUMMARY OF THE INVENTION

The disadvantages of the prior art are overcome by the present invention, which, in one aspect, is an ophthalmic lens that includes an optical zone having a center and a spaced-apart periphery. The optical zone has a first corrective power range in a first region and a second corrective power range in an annular region that surrounds the first region. The lower limit of the first corrective power range is around a manifest refractive power. The second corrective power range comprises negative spherical aberrations varying with diameter and is smaller than the manifest refractive power. The optical zone has a power profile in which the corrective powers of the lens decreases from the center to the periphery.

The optical zone has a first variable optical power corrective zone in a first region nearly coaxial to the center and a second corrective power zone in an annular region that is coaxial with the center and surrounds the first variable optical power corrective zone. The second corrective region corrects spherical aberration, of the eye, in a predetermined amount at a 6 mm diameter pupil. The surface of the first region is defined by a spline to provide the optimal power profile for intermediate vision. The lower limit (i.e., the optical power at the boundary of the first region with the annular region) of the first power profile range is approximately equal to the manifest distance refractive power. The optical zone has a power profile that gradually changes from the first corrective power to the second corrective power. The surface of first corrective power region is tangent to the surface of the annular region. In the first embodiment, the first optical power zone may be a perturbation to the optical zone of the base curve. In the second embodiment, the first optical zone may be a perturbation to the front curve.

In another aspect, the invention is a method of making an ophthalmic lens, in which a power profile of a lens is determined so that the lens has a first variable corrective power zone at a point adjacent the optical axis and so that the lens has a second corrective power zone adjacent the periphery and surrounding the first corrective power zone. The second corrective power zone can corrects spherical aberration of an eye. A model of a lens having the power profile is generated. A lens, mold or tool is turned on a lathe to create an object having a shape that conforms to the model.

In another aspect, the invention is a method of designing an ophthalmic lens having an optical axis and a spaced-apart periphery that is coaxial or nearly coaxial with the optical axis. A description of a power profile of the lens is generated so that the lens has a first corrective power zone at a point adjacent the optical axis and so that the lens has a second corrective power zone adjacent the periphery and surrounding the first corrective power zone. The second corrective zone corrects spherical aberration, of the eye, in a predetermined amount at a 6 mm diameter. The surface of the first corrective power is defined by a spline function to create the optimal power profile. The first power zone description is sampled at a predetermined number of evenly spaced points across the lens and a spline function is fit through the points to create the variable power profile. A fourth-order polynomial that describes the second optical power zone. The optical powers of the first optical zone, the variable ADD zone, are always equal to or higher than the optical power of the base lens correction.

In another aspect, the invention is an ophthalmic lens having an optical axis, a central optical zone and a peripheral optical zone surrounding the central optical zone. The central optical zone has a first diameter and a first corrective power range corresponding to near and intermediate vision. The peripheral optical zone has a second diameter that is greater than the first diameter. The peripheral optical zone is coaxial or nearly coaxial with the central optical zone and provides distance intermediate vision correction.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

As used herein "manifest refraction" means a user's subjective best correction for an eye. The "manifest corrective refractive power" means a refractive power required for achieving a user's subjective best correction for an eye.

As used herein "negative spherical aberration" in reference to a lens means that the optical power decreases as the value of diameter increases. The amount of spherical aberration depends on the diameter. For a lens having a negative spherical aberration, its optical power at the center is larger than an optical power at any diameter. It should be understood that where a lens having a negative power (e.g., −6 diopters), its optical power at any diameter is more negative than its optical power at the center.

Figure 1B:
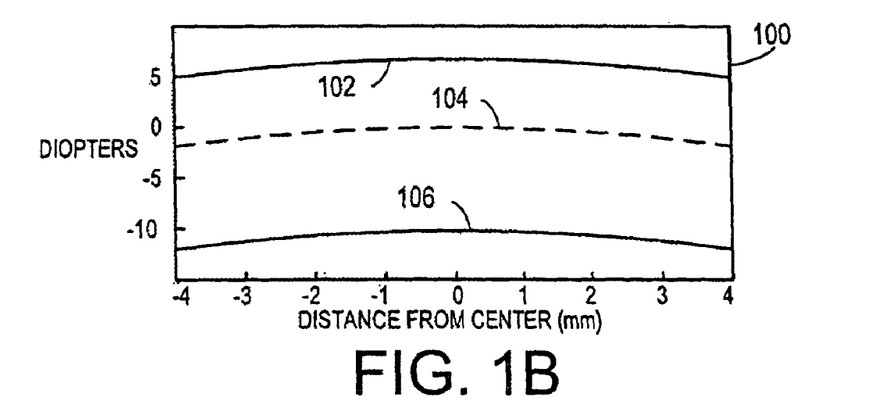
FIG. 1B is a power profile diagram showing corrective power curves for three types of lenses according to one embodiment of the invention, as a function of distance from the line of sight.

One embodiment of the invention is a lens that cancels the nominal amount of spherical aberration of the eye, which is approximately 1 diopter at a 6 mm diameter pupil for an adult, regardless of the eye's sphero-cylindrical manifest refraction. Lenses according to the invention have a power profile as shown in FIG. 1B, a power profile diagram 100 showing correction as a function of distance from the center of the cornea. Curve 102 is for an eye requiring +6 diopters of correction (i.e., manifest refractive power), curve 104 is for a normal eye not otherwise requiring correction, and curve 106 is for an eye requiring −10 diopters of correction (i.e., manifest refractive power). Essentially, in this embodiment of the invention the optical power of the lens decreases outwardly from the center to the outer periphery such that the optical power at a 6 mm diameter is one diopter smaller than the nominal amount of correction (i.e., manifest refractive power) for the eye.

Figure 1C:
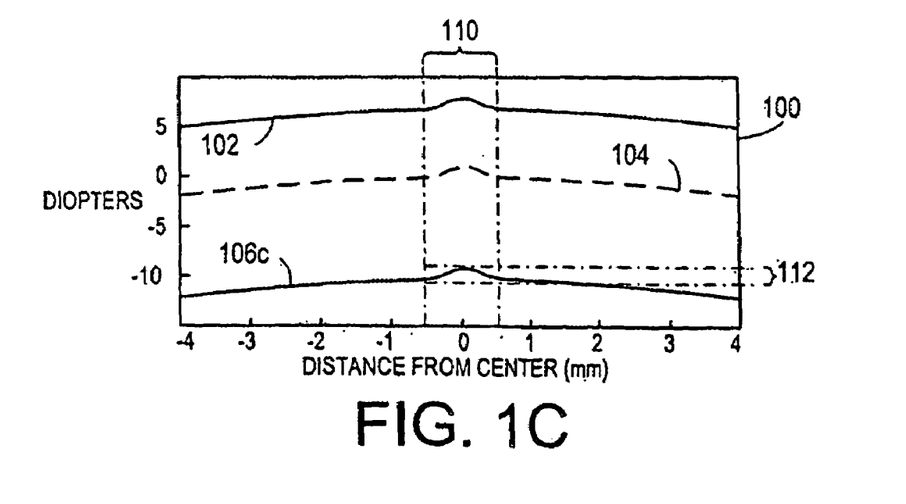
FIG. 1C is a power profile diagram showing corrective power curves for three types of lenses according to one embodiment of the invention in which a progressive zone has been added central to the lens, as a function of distance from the center of the cornea.
Figure 1D:
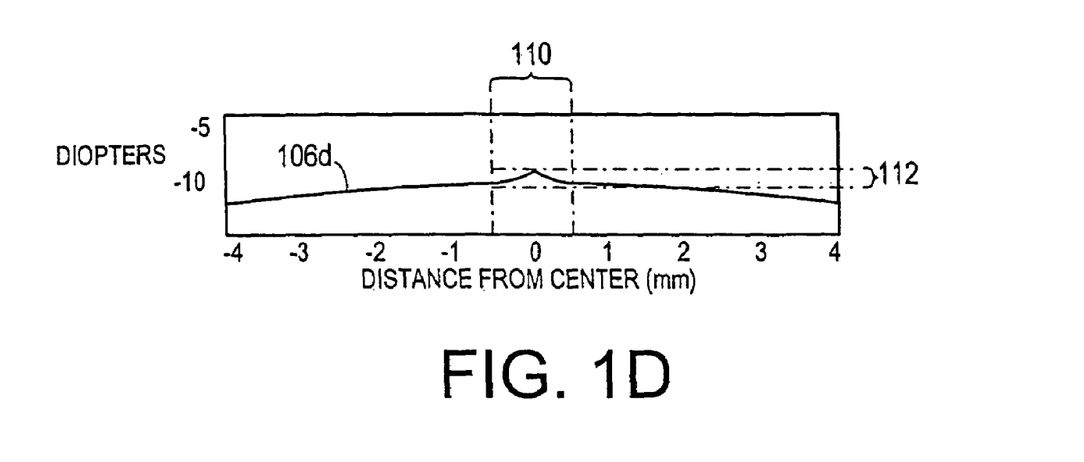
FIG. 1D is a diagram showing an alternative power profile.
Figure 1E:
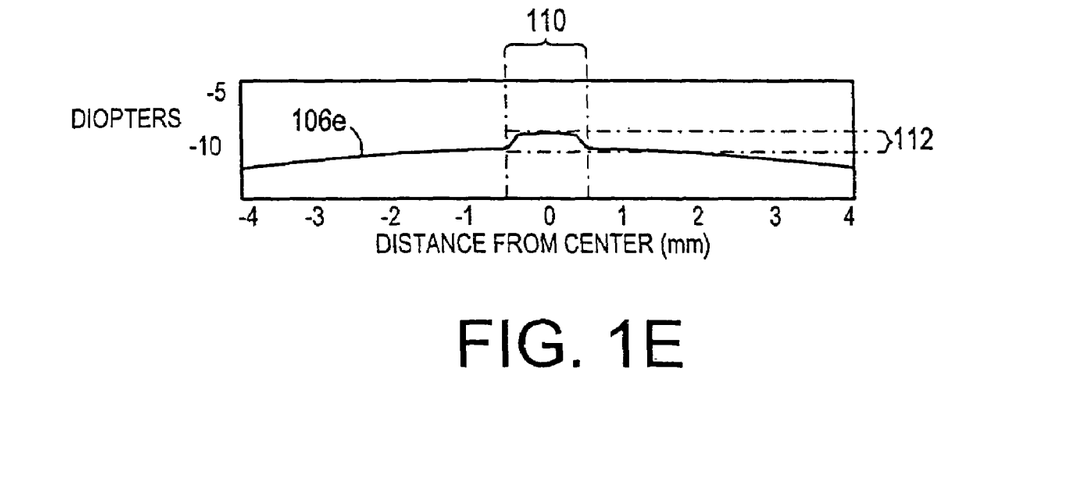
FIG. 1E is a diagram showing an alternative power profile.

In one embodiment, as shown in FIG. 1C, a central (also referred to as progressive) zone 110 may be added to the lens. The central zone 110 provides intermediate vision correction 112 in a region central to the lens, whereas a peripheral zone 106c provides correction for spherical aberration. When a user is in front of a computer screen, the light from the screen will cause the user's pupil to contract (myosis) roughly to the point where the pupil is subtended by the central zone 110 and, thus, the lens provides intermediate correction that is optimal for computer usage. When the user is in low light situations (scotopic viewing), the central zone 110 has little effect on the user's vision because the aperture of the pupil dilates to the point where most of the light entering the eye is outside of the central zone 110. When the user is in bright light conditions, such a in sunlight, the user's pupil contracts to the point where the focusing effect causes most objects to be in focus, irrespective of the effect of the central zone 110. For an optical system, the depth of focus is inversely proportional to the pupil diameter. Thus, distant objects in bright light are in focus. FIGS. 1D and 1E show alternative power profiles. The ADD function (the amount of power added to the lens and the functional shape of the ADD zone) for the lens profile 106d shown in FIG. 1D would typically have a diameter of 1.5 mm to 3 mm, whereas ADD function for the lens profile 106e shown in FIG. 1E would typically have a diameter of less than about 2.2 mm, preferably from about 1.0 mm to about 1.8 mm.

Figure 2:
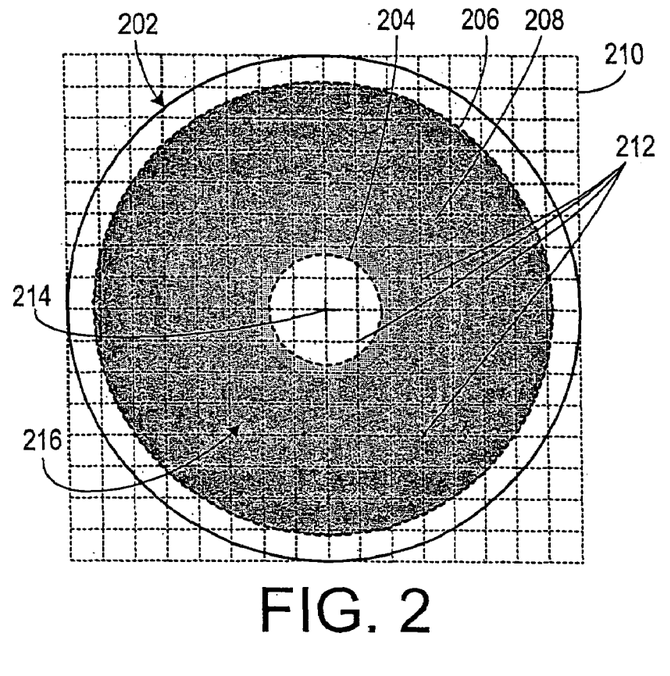
FIG. 2 is a conceptual diagram showing use of a grid to select points of a map of a lens model.

A lens according to one embodiment of the invention can be preferably designed by generating a model 202 of a lens. The model includes a description of an optical zone 216 on one of the two opposite surfaces of the lens. The optical zone 216 has a region 204 coaxial or nearly coaxial to the center 214 and a annular region 208 that is coaxial with the center 214 and adjacent to the periphery 206. The region 204 provides optical powers (a first optical power range) for intermediate correction. The annular region 208 has varying optical powers (a second optical power range) being smaller than the manifest corrective refractive power and includes negative spherical aberration to compensate for the spherical aberration of an eye. The optical zone 216 has a power profile that gradually changes from the center to the periphery of the optical zone 216. After a desired power profile is determined, one can generate a mathematical description to define the surface of the optical zone 216, which provide the desired optical power profile, according to any known suitable methods. For example, the mathematical description to define the surface of the optical zone 216 can be generated in a recursive manner. A desired power profile of the lens can be sampled at a predetermined number of evenly spaced points 212 across the lens. A grid 210 may preferably used to define the evenly-space points 212, at each of which there is one curvature to provide one optical power. A fourth-order polynomial (or a conic function) is generated that connect each of the evenly-spaced points located in the annular region 208 and describes a surface providing the varying optical powers, using a conventional computer-based analysis tool. A spline function is generated that connects each of the evenly spaced points 212 within the first power zone 204 and describes a surface providing the first optical power range, using a conventional computer-based analysis tool. The surface of the first optical zone 204 is tangent to the surface of the annular region 208. The surfaces described by the spline and the fourth-order polynomial is then used by a conventional contact lens lathe system or functionally equivalent system to manufacture a lens. Preferably, the second corrective power will equal the manifest refractive power less 1 diopter at a 6 mm zone diameter, to cancel the nominal spherical aberration of the average eye across the diameter of the cornea. Where the optical zone 216 is rotationally symmetric, the surface of the optical zone can be formed by rotating a curve around an axis passing through the center 214.

Figure 3:
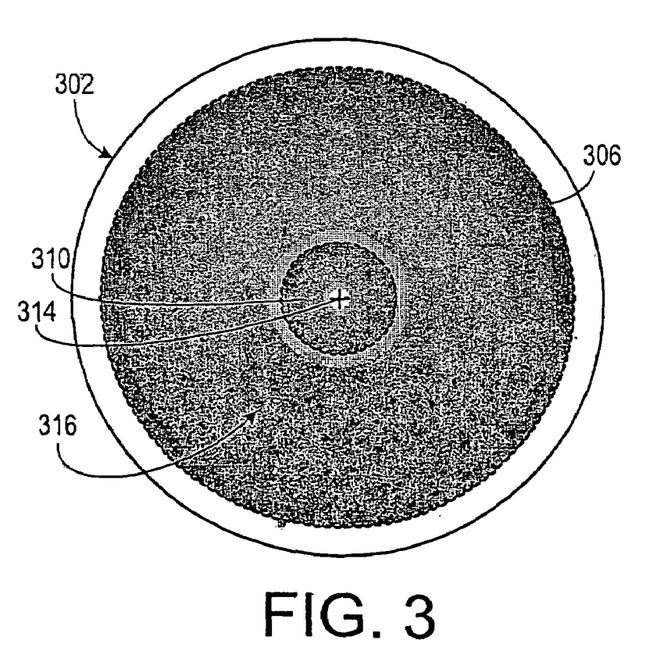
FIG. 3 is front view of a lens according to one aspect of the invention.
Figure 4A:
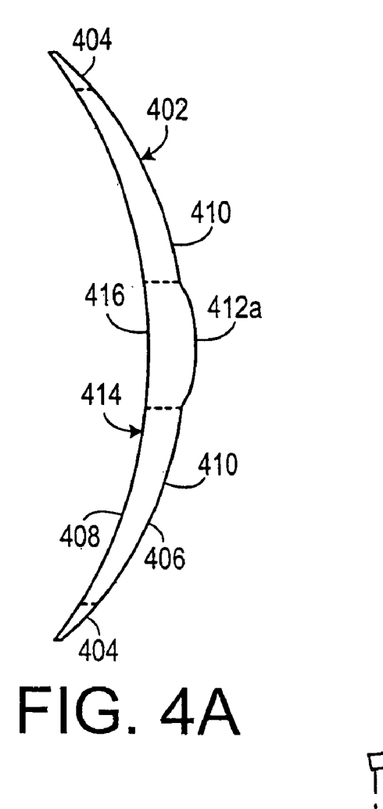
FIG. 4A is a cross-sectional view of a lens according to a second aspect of the invention.
Figure 4B:
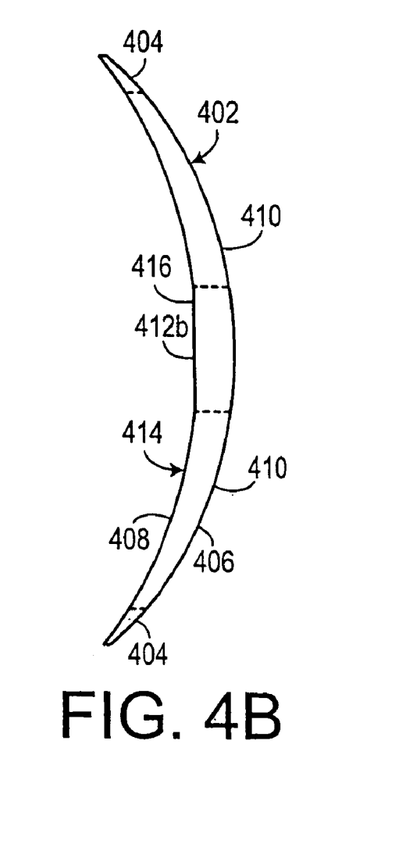
FIG. 4B is a cross-sectional view of an alternative embodiment of a lens according to the invention.
Figure 4C:
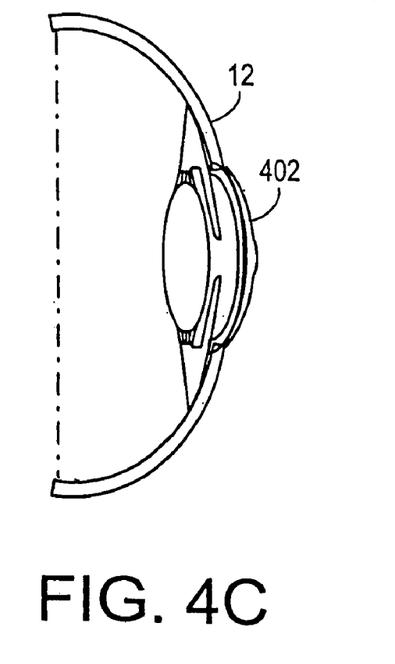
FIG. 4C is a cross-sectional view of a lens according to the invention, as applied to an eye.

The embodiment using intermediate correction is shown in FIG. 3. In this embodiment, the lens 302 includes an optic zone 316 having a center 314 and a peripheral zone 306. The central zone 310 is predominately central to the optic zone 316. Cross-sectional views of several embodiments of a lens 402 according to the invention are shown in FIGS. 4A–4D. Each embodiment includes a lens 402 having a posterior surface 408 and an opposite anterior surface 406. The lens also has an optic zone 414 and may have a non-optic region 404 at the extreme periphery of the lens to provide complete corneal coverage. The optic zone 414 includes a central region 416 and an annular region 410 that is nearly coaxial with the central region 416. As shown in FIG. 4A, the topography of at least a portion of the anterior side 406 in the central region 416 may be manipulated to add the progressive zone 412a. Similarly, as shown in FIG. 4B, the progressive zone 412b may be formed by manipulating the topography of the posterior side 408. A lens 402 applied to an eye 12 is shown in FIG. 4C. Typically, the lens may be stabilized using a double slab-off design, a prism ballast or a non-prism ballast design.

The ADD function in the progressive zone 310 will, most likely, be a function of the wearer's age. However, the ideal lens will also correspond to the wearer's lifestyle. The ideal amount of spherical aberration of the periphery of the lens will typically be designed to be more negative for older (presbyopic) individuals.

An ophthalmic lens of the invention can be designed using any known, suitable optical design system. Exemplary optical computer aided design systems for designing an optical model lens includes, but are not limited to ZEMAX (ZEMAX Development Corporation.). Preferably, the optical design will be performed using a tool such as ZEMAX (ZEMAX Development Corporation). The design of the optical model lens can be transformed by, for example, a mechanical computer aided design (CAD) system, into a set of mechanical parameters for making a physical lens. Any know suitable mechanical CAD system can be used in the invention. The design of an optical model lens may be translated back and forth between the optical CAD and mechanical CAD systems using a translation format which allows a receiving system, either optical CAD or mechanical CAD, to construct NURBs (nonuniform rational B-splines) or Beizier surfaces of an intended design. Exemplary translation formats include, but are not limited to, VDA (verband der automobilindustrie) and IGES (Initial Graphics Exchange Specification). By using such translation formats, overall surface of lenses can be in a continuous form that facilitates the production of lenses having radially asymmetrical shapes. Beizier and NURBs surface are particular advantageous for a lens having a plurality of zones including optical zone and non-optical zones because multiple zones can be blended, analyzed and optimized. More preferably, the mechanical CAD system is capable of representing precisely and mathematically high order surfaces. An example of such mechanical CAD system is Pro/Engineer from Parametric Technology.

When transforming the design of an optical model lens into a set of mechanical parameters, common feature parameters of a family of ophthalmic lenses can be incorporated in the lens designing process. Examples of such parameters include shrinkage, non-optical edge zone and its curvature, center thickness, range of optical power, and the like.

An ophthalmic lens of the invention may be produced by any convenient manufacturing means, including, for example, a computer-controllable manufacturing device, molding or the like. A "computer controllable manufacturing device" refers to a device that can be controlled by a computer system and that is capable of producing directly an ophthalmic lens or an optical tool for producing an ophthalmic lens. Any known, suitable computer controllable manufacturing device can be used in the invention. Exemplary computer controllable manufacturing devices includes, but are not limited to, lathes, grinding and milling machines, molding equipment, and lasers. Preferably, a computer controllable manufacturing device is a two-axis lathe with a 45° piezo cutter or a lathe apparatus disclosed by Durazo and Morgan in U.S. Pat. No. 6,122,999 (herein incorporated by reference in its entirety), or is a numerically controlled lathe, for example, such as Optoform® ultra-precision lathes (models 30, 40, 50 and 80) having Variform® or Varimax piezo-ceramic fast tool servo attachment from Precitech, Inc.

Preferably, contact lenses are molded from contact lens molds including molding surfaces that replicate the contact lens surfaces when a lens is cast in the molds. For example, an optical cutting tool with a numerically controlled lathe may be used to form a metallic optical tool incorporating the features of the anterior surface of a contact lens of the invention. The tool is then used to make anterior surface molds that are then used, in conjunction with posterior surface molds, to form the lens of the invention using a suitable liquid lens-forming material placed between the molds followed by compression and curing of the lens-forming material.

Preferably, an ophthalmic lens of the invention or the optical tool to be used for making the same is fabricated by using a numerically controlled lathe, for example, such as Optoform® ultra-precision lathes (models 30, 40, 50 and 80) having Variform® or Varimax piezo-ceramic fast tool servo attachment from Precitech, Inc.

As an illustrative example, production of a translating contact lens having a ramped ridge zone having a latitudinal ridge is created via the following process. First, a user defines a set of parameters, such as a surface tolerance, a concentricity tolerance, orientation of the lens design, the number of semi-diameter spokes to be generated for each of the anterior and posterior surfaces, creating zero point at 0,0, orientation of Z-axis, and type of lens surface (concave or convex surface) to be converted into a geometry. A "surface tolerance" refers to the allowed position-deviation of a projected point from an ideal position on a surface of a lens design. The deviation can be in the direction either parallel or perpendicular to the central axis of a lens design. A "concentricity tolerance" refers to the allowed deviation of a point from a given arc. A "semi-diameter spoke" refers to a radiating outwardly from the central axis and is perpendicular to the central axis and projected onto the surface. "Evenly-spaced semi-diameter spokes" means that all semi-diameter spokes radiate outwardly from the central axis and separate from each other by one equal angle. A "point spacing" refers to a distance between two points along the semi-diameter spoke.

Second, a user determines the point density to be projected onto the surface of the lens design (for example, the anterior surface) along each of the number of evenly-spaced semi-diameter spokes in a direction parallel to the central axis. A semi-diameter spoke at an azimuthal angle corresponds to the feature that deviates most from the base conic surface, and is selected as the semi-diameter probing spoke. Evenly-spaced points are projected along the semi-diameter probing spoke, in which each pairs of points are separating by a point spacing of typically 10 microns. Then all of the projected points are divided into a series of groups, with each group composed of three consecutive points, a first point, a middle point, and a third point. Each of the points can belong to either one group or two groups. One group is analyzed at a time from the central axis to the edge, or from the edge to the central axis, from the curvature of the surface at the middle point of the group by comparing a distance between the middle point and a line linking the first point and the third point of the corresponding group with the predetermined surface tolerance. If the distance between the middle point and the line linking the first and third points of the group is larger than the predetermined surface tolerance, the curvature of the surface at that point is sharp and an additional point is projected between the first and the middle points in that group. The point spacing between the first and additional points is equal to point spacing between the additional and middle points. After adding an additional point, all of the points included the newly added point is regrouped again and the curvature of the surface at the middle point of each of the series of groups is analyzed. Such iterative procedure is repeated until the distance between the middle point of each of the series of groups and the line linking the first and the third points of corresponding group along the probing spoke is equal to or less than the predetermined surface tolerance. In this manner, the number of the points to be projected onto the surface of the lens design along each of the desired number of evenly-spaced semi-diameter spokes and point spacing for a series of pairs of neighboring points are determined.

The above-determined number of points is then projected onto the anterior surface of the lens design along each of 24, 96 or 384 semi-diameter spokes, in the preferred embodiment. Other numbers of spokes are possible. For each of the semi-diameter spokes, a semi-meridian that is continuous in first derivative is generated. The semi-meridian includes a series of arcs and, optionally, straight lines wherein each arc is defined by fitting at least three consecutive points into a spherical mathematical function within a desired concentricity tolerance. Each of the straight lines is obtained by connecting at least three consecutive points. Preferably, the arc-fitting routine is started from the central axis to the edge. Similarly, conversion of the posterior surface of the lens design into a geometry can be carried out according to the above-described procedure.

After converting the lens design to a geometry of a contact lens to be produced in a manufacturing system, a mini-file, or equivalent format, containing both the information for the header and the information about the geometry of the lens is generated. This mini-file also contains a zero semi-meridian that is based on the average height of each of the other meridians at each of radial locations and that gives the Variform or Varimax a zero position on which it can base its oscillation calculations. In this mini-file, all semi-meridians have the same number of zones. This is accomplished by copying the last zone of a semi-meridian for a number of times to equalize the numbers of zones for all meridians. After the mini-file is completed, it is loaded into an Optoform® ultra-precision lathe (models 30, 40, 50 or 80) having Variform® piezo-ceramic fast tool servo attachment and run to produce a translating contact lens.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. An ophthalmic lens, comprising an optical zone having a center and a spaced-apart periphery,
    the optical zone having a first corrective power range in a first region and a second corrective power range in an annular region that surrounds the first region, wherein the surface of the first region is described by a spline function and wherein the surface of the annular region is described by a polynomial or conic function;
    the lower limit of the first corrective power range being equal approximately to the manifest corrective refractive power for an eye;
    the upper limit of the second corrective power range being equal approximately to the manifest corrective refractive power for the eye;
    the second corrective power range having negative spherical aberration varying with diameter and being less than the manifest corrective refractive power for an eye at the periphery of the optical zone; and
    the optical zone having a power profile such that the optical power of the optical zone decreases from the center to the periphery of the optical zone.

2. The ophthalmic lens of claim 1, wherein the first region is coaxial with the center.

3. The ophthalmic lens of claim 1, wherein the annular region is coaxial with the center.

4. The ophthalmic lens of claim 1, wherein the upper limit of the first corrective power range is 2 to 6 diopters greater than the manifest corrective refractive power for the eye.

5. The ophthalmic lens of claim 1, wherein corrective power at a 6 mm diameter is 0.5 to 2 diopters less than the manifest corrective refractive power for an eye.

6. The ophthalmic lens of claim 1, wherein the optical zone has an axis and wherein the axis of the optical zone is aligned to a line-of-sight of an eye.

7. The ophthalmic lens of claim 2, wherein the first region is a circular zone having a first diameter no greater than a diameter of a pupil exposed to bright light.

8. The ophthalmic lens of claim 7, wherein the first diameter is less than 2.0 mm.

9. The ophthalmic lens of claim 8, wherein the upper limit of the first corrective power range is 2 to 6 diopters greater than the manifest corrective refractive power for the eye, and wherein corrective power at a 6 mm diameter is 0.5 to 2 diopters less than the manifest corrective refractive power for an eye.

10. The ophthalmic lens of claim 2, wherein the annular region is coaxial with the center.

11. The ophthalmic lens of claim 10, wherein the upper limit of the first corrective power range is 2 to 6 diopters greater than the manifest corrective refractive power for the eye.

12. The ophthalmic lens of claim 11, wherein corrective power at a 6 mm diameter is 0.5 to 2 diopters less than the manifest corrective refractive power for an eye.

13. The ophthalmic lens of claim 12, wherein the optical zone has an axis and wherein the axis of the optical zone is aligned to a line-of-sight of an eye.

14. The ophthalmic lens of claim 13, wherein the first region is a circular zone having a first diameter no greater than a diameter of a pupil exposed to bright light.

15. The ophthalmic lens of claim 14, wherein the first diameter is less than 2.0 mm.

16. The ophthalmic lens of claim 10, wherein the upper limit of the first corrective power range is 2 to 6 diopters greater than the manifest corrective refractive power for the eye, and wherein corrective power at a 6 mm diameter is 0.5 to 2 diopters less than the manifest corrective refractive power for an eye.

* * * * *